Oct. 1, 1929.　　　H. A. FARRAND　　　1,730,199
COILING MEANS FOR CONCAVO CONVEX SPRINGS
Filed Dec. 16, 1926　　　2 Sheets-Sheet 1
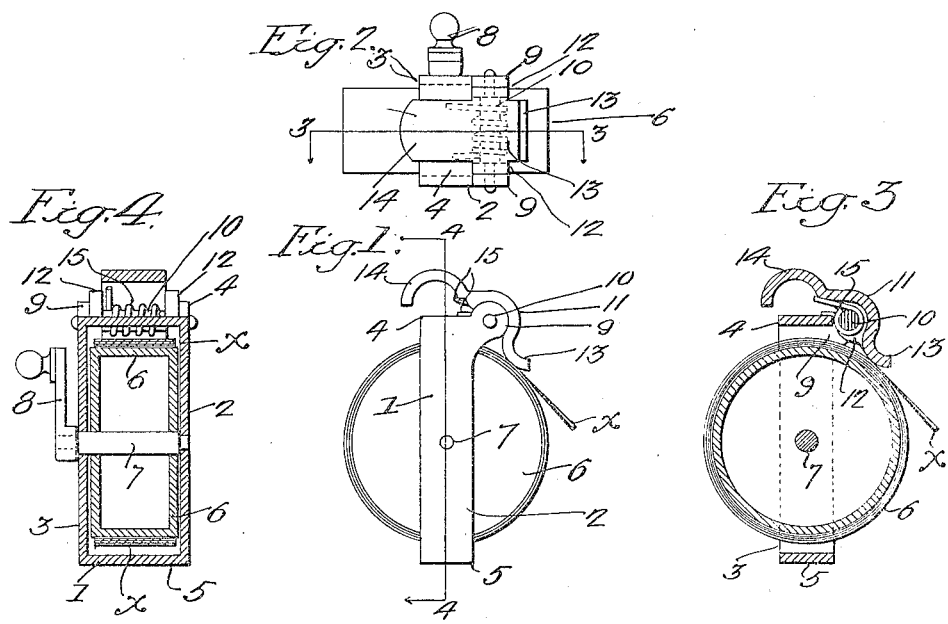
Inventor:
Hiram A. Farrand
by his Attorneys.
Howson + Howson

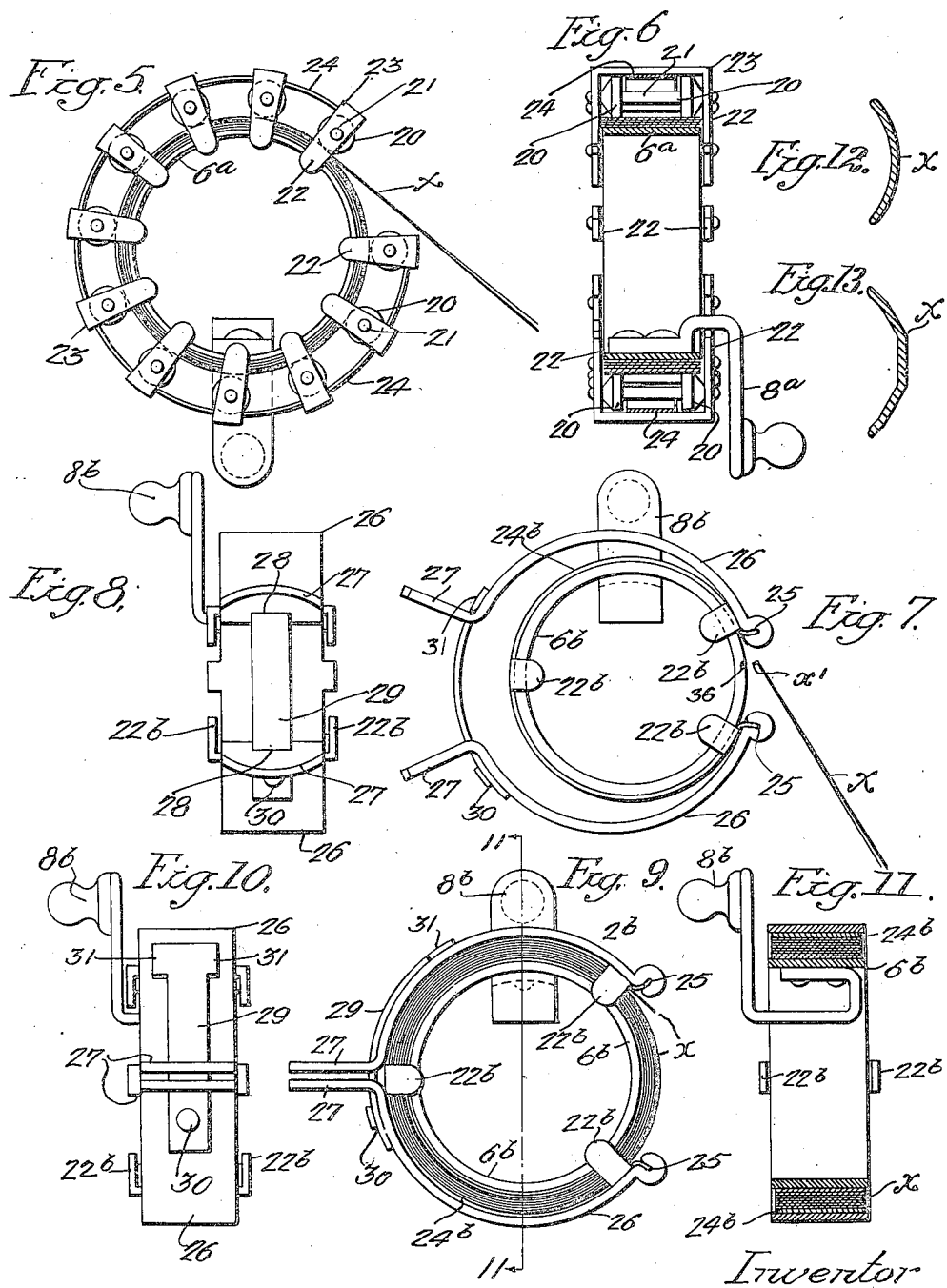

Patented Oct. 1, 1929

1,730,199

UNITED STATES PATENT OFFICE

HIRAM A. FARRAND, OF BERLIN, NEW HAMPSHIRE

COILING MEANS FOR CONCAVO-CONVEX SPRINGS

Application filed December 16, 1926. Serial No. 155,268.

My invention relates to means for coiling and controlling concavo-convex springs, and especially to those forming the foundation or base for resilient rules of the type shown in my co-pending application for patent, Serial No. 143,267. Springs of this type, when coiled, receive a transverse flexure which straightens the cross-sectional arch thereof into a flat ribbon-like state, due to the longitudinal flexure produced by coiling, and when released or unrestricted the spring will extend itself into a stiff rod-like state, due to its natural tendency to return to its original arcuate form in cross-section. This natural tendency to return to the arch-like cross-sectional form reacts to straighten the spring longitudinally and to stiffen the extended spring against longitudinal buckling.

Coiling of a spring of this type may be accomplished by either one of two methods which I term "internal winding" and "external winding". This application deals with the "external winding", which will be fully disclosed hereinafter. The "internal winding" method is dealt with in a separate co-pending application, Serial No. 162,512, filed January 21, 1927.

Referring to the drawings:

Fig. 1 is a side elevation of the preferred form of a device adapted to control a concavo-convex spring, and made in accordance with my invention;

Fig. 2 is a plan view;

Fig. 3 is a longitudinal sectional elevation taken on the line 3—3, Fig. 2;

Fig. 4 is a transverse sectional elevation taken on the line 4—4, Fig. 1;

Fig. 5 is a side elevation and a modified form of my invention;

Fig. 6 is a transverse sectional elevation taken on the line 6—6 of Fig. 5;

Fig. 7 is a side elevation of another modified form of the invention;

Fig. 8 is an edge elevation of the structure shown in Fig. 7;

Fig. 9 is a side elevation similar to Fig. 7, showing the spring as being coiled;

Fig. 10 is an edge elevation of the structure shown in Fig. 9;

Fig. 11 is a transverse sectional elevation taken on the line 11—11, Fig. 9;

Figs. 12 and 13 respectively show two cross-sectional illustrations of different forms of concavo-convex springs.

As shown in Figs. 1 to 4 inclusive, my improved coiling and controlling device comprises a substantially rectangular frame 1 having side members 2 and 3 and upper and lower portions 4 and 5 respectively which integrally connect the side members 2 and 3. Within the frame 1 is a drum 6 which is secured to a shaft 7 rotatably mounted in the side members 2 and 3, and provided adjacent the side member 3 with an operating crank 8. Each of the side members 2 and 3 is provided with a laterally extending ear 9 in which is mounted a pivot pin 10 for a controlling element 11.

The controlling element 11 is provided with ears 12 which are apertured for the reception of the pivot pin 10, on which the said controlling element is adapted to oscillate. At one side of the pivot pin 10 the control element is provided with a shoe 13, which is adapted to confine the spring tape $x$ between itself and the periphery of the drum 6. At the opposite side of the pivot 10, the control element 11 is provided with a finger pad or release lever 14. A coiled spring 15 encircles the pivot pin 10, and has one of its ends in engagement with the top member 4 of the frame and its opposite end in operative engagement with the underside of the release lever 14, as shown in Fig. 3.

In operation one end of the concavo-convex spring $x$, which it is desired to coil into a compact form, is passed under the shoe 13, completely around the periphery of the drum 6 and under that portion of the spring which has been engaged by the shoe 13. In so doing, the said first turn of the spring, or that which may be termed the core loop, is changed from a concavo-convex or arcuate cross-sectional form to a flat ribbon-like cross-sectional form, due to the longitudinal flexure of said spring reacting against the natural cross-sectional curve of said spring. This first inserted end may or may not be secured to the periphery of the drum 6, as desired.

Subsequent operation of the crank 8 will rotate the drum 6 and wind the resilient rule or spring $x$ in successive externally wound coils, that is, each turn wound upon the outer surface of the preceding turn. The shoe 13 tends to change the cross-sectional form of the spring rule $x$ as it passes under the curved end of said shoe by a pressure being exerted on the rule $x$ by the shoe 13 as applied by the spring 15 which overbalances the natural strength of the spring of the cross-sectional arcuate form of the resilient rule.

Upon pressure being applied to the releasing lever 14, the pressure of the shoe 13 on the spring rule $x$ is reduced and the natural tendency of the spring rule to return to its arcuate cross-sectional form reacts upon the device in a manner causing the drum 6 to be rotated in an opposite direction to that above noted, and the spring rule to be projected from the device in a stiff rod-like form.

It will be noted that if the spring rule is so engaged at its point of tangency with the drum 6, or the coils previously wound thereon, that the said rule is changed in cross-sectional form from an arcuate form to a flat form the rule will remain quiescent, but as soon as the pressure is released from the said rule its natural tendency to return to its arcuate cross-sectional form reacts to unwind the rule by turning the drum in the manner as above described.

In Fig. 5, the drum 6 is replaced by a core ring $6^a$ upon which the spring rule $x$ may be wound in successive turns one upon the other and externally of the core ring $6^a$ and the previously wound turns of the spring rule. The shoe 13 is replaced by a series of anti-friction rollers 20, each of which is rotatably mounted on an axle 21 journalled in inwardly extending legs 22 of a U-shaped member 23. The members 23 are each secured to a circular spring member 24 which extends concentric with and around the core ring $6^a$. The supporting legs 22 extend radially inward, toward the center of said core ring, and engage the sides of said core ring and the edges of the resilient rule $x$ and thereby confine the said rule between the outer periphery of the said core ring and the rollers 20. The natural tendency of the spring 24 is to move inwardly and at all times to remain concentric with the core ring $6^a$, consequently pressing the several rollers 20 against the outermost turn of the spring rule $x$, thereby maintaining the said rule in a flat cross-sectional form from its point of tangency with and completely around the said core ring $6^a$.

The core ring $6^a$ is provided with an operating handle or crank $8^a$ whereby the rule may be wound upon the core ring $6^a$ in substantially the same manner as described relative to the preferred form of the device as illustrated in Figs. 1 to 4 inclusive. In this modified form of the invention no release is shown, therefore, in order to unwind the rule $x$ it is necessary to pull the end of the rule outward and thereby unwind the rule manually.

In Figs. 7 to 11 inclusive, a still further modification of the device is illustrated which includes a core ring $6^b$ having a spring $24^b$ mounted concentric therewith, whose natural tendency is to cling to the outer periphery of the core ring $6^b$. The confining spring $24^b$ is provided with inwardly projecting legs $22^b$. The outer ends 25 of the spring $24^b$ are each secured in one end of a segmental releasing arm 26, each of which is provided with a finger grip 27 which extends substantially in a radial line relative to center of the core ring $6^b$. Each of the finger grips 27 is provided with an aperture 28 through which extends limiting tongue 29. The limiting tongue 29 is secured to one of the controlling arms 26, as shown at 30, and is provided with laterally extending lugs 31 at the outer side of the other finger grip 27, as clearly shown in Fig. 10. As shown in Fig. 7, one end of the resilient spring rule $x$ is forced between the outer periphery of the core ring $6^b$ and the inner face of the immediately adjacent confining spring $24^b$, and subsequent operation of the crank $8^b$, which is secured to the core ring $6^b$, will cause the spring rule $x$ to be wound upon the said core ring in successive turns externally of each other until the rule is completely wound in the manner illustrated in Fig. 9, in which the core ring $6^b$, the rule $x$ and the releasing arms 26, 26 are substantially concentric each with the others, and the limiting lugs 31 of the limiting tongue 29 have been moved a considerable distance from the finger grip 27. As in each of the previous noted instances the spring $x$ has been changed in cross-sectional form from the arcuate or concavo-convex to the flat, as shown in Fig. 11.

In this form of device, by pressing the finger grips 27, 27 toward each other the pressure is released from the spring $x$ at its point of tangency relative to the core ring $6^b$, and the successively wound turns of the spring $x$ thereon and the spring $x$ thereby, due to its natural tendency to return to its arcuate cross-sectional form, will automatically unwind itself in the manner above noted.

One end of the spring rule $x$ may be secured to the core member of the device in any desired manner, such as riveting, etc. In Fig. 7, I have shown one end of the spring rule $x$ as being provided with a projection $x'$ adapted to fit within a slot 36 formed in the periphery of the core ring $6^b$ so that when the said core ring is rotated in a manner to wind the spring rule $x$ into a coil no relative movement or slippage between the end of the spring rule and the core ring will be possible.

It is to be understood that in each instance where the spring rule is described as being projected from the coiling device, due to the natural tendency of the spring rule to return to its concavo-convex, or arcuate cross-sectional, form, such projection may be assisted manually in the manner described relative to the form of the device, illustrated in Fig. 5, if found desirable.

In the forms of the device illustrated in Figs. 5 and 9, the braking means extend circumferentially of a coiled spring, and by so doing prevents the rule from being projected from the device, accidently or intentionally, at any other than the desired point of tangency, thus obviating the formation of loops or other undesirable projections of the rule, which may cause the rule to be injured when the device is in the hands of some incompetent person.

I claim:

1. In combination with a concavo-convex spring compactly formed into a substantially spiral externally wound coil and having an inherent tendency to assume a rectilineal state; means for controlling said spring while in said compact form comprising a core member; a brake comprising a rigid portion extending transversely of the spring which is adapted to engage said spring when wound on said core member to change said spring from an arcuate cross-sectional form to a flat cross-sectional form; and means for releasing said spring from said brake.

2. In combination with a concavo-convex spring compactly formed into a substantially spiral externally wound coil and having an inherent tendency to assume a rectilineal state; means for controlling said spring while in said compact form, comprising an element which is rigid in a direction transversely of said spring and adapted to engage the outer convolution of said coil and transform said concavo-convex spring from its natural arcuate cross-sectional form to a flat cross-sectional form and to maintain said spring in said flat form when in its coiled formation.

3. In combination with a concavo-convex spring compactly formed into a substantially spiral externally wound coil and having an inherent tendency to assume a rectilineal state; means for controlling said spring while in said compact form, comprising an element which is rigid in a direction transversely of said spring and adapted to engage and maintain said concavo-convex spring in a flat cross-sectional state circumferentially of said coil; and means for passing said spring into and out of such compact formation.

4. In combination with a concavo-convex spring compactly formed into a substantially spiral externally wound coil and having an inherent tendency to assume a rectilineal state; means for controlling said spring while in said compact form, comprising an element which is rigid in a direction transversely of said spring and adapted to engage and maintain said concavo-convex spring in a flat cross-sectional state at its point of tangency with an underlying turn of said coil; and means for passing said spring into and out of such compact formation.

5. In combination with a concavo-convex spring compactly formed into a substantially spiral externally wound coil and having an inherent tendency to assume a rectilineal state; means for controlling said spring while in said compact form comprising a frame; a drum carried by said frame; a brake on said frame having a rigid portion extending transversely of the spring which is adapted to engage said spring when wound on said drum to change said spring from an arcuate cross-sectional form to a flat cross-sectional form; means for applying pressure on said spring by said brake; and means for rotating said drum.

6. In combination with a concavo-convex spring compactly formed into a substantially spiral externally wound coil and having an inherent tendency to assume a rectilineal state; means for controlling said spring while in said compact form comprising a frame; a drum carried by said frame; a brake on said frame having a rigid portion extending transversely of the spring which is adapted to engage said spring when wound on said drum to change said spring from an arcuate cross-sectional form to a flat cross-sectional form; means for applying pressure on said spring by said brake; means for releasing said brake from said spring; and means for rotating said drum.

7. In combination with a concavo-convex spring compactly formed into a substantially spiral externally wound coil and having an inherent tendency to assume a rectilineal state; means for controlling said spring while in said compact form comprising a core member; means for securing one end of said spring to said core member; a brake comprising a rigid portion extending transversely of the spring which is adapted to engage said spring when wound on said core member to change said spring from an arcuate cross-sectional form to a flat cross-sectional form; and means for releasing said spring from said brake.

HIRAM A. FARRAND.